(12) United States Patent
Deets

(10) Patent No.: US 6,793,271 B1
(45) Date of Patent: Sep. 21, 2004

(54) TRANSPARENT SHIPPING CONTAINER

(76) Inventor: Edward Deets, 55 Brook La., Mountaintop, PA (US) 18707

(*) Notice: Subject to any disclaimer, the term of this patent is extended or adjusted under 35 U.S.C. 154(b) by 0 days.

(21) Appl. No.: 10/604,417

(22) Filed: Jul. 18, 2003

(51) Int. Cl.$^7$ .......................... B62D 33/04; B61D 17/00
(52) U.S. Cl. ..................... 296/182.1; 296/191; 105/396
(58) Field of Search .......................... 296/182.1, 186.1, 296/186.4, 186.5, 185.1, 191, 193.05, 24.3, 29; 105/396, 404; 52/270, 582.2

(56) References Cited

U.S. PATENT DOCUMENTS

| | | | |
|---|---|---|---|
| 1,193,657 A | | 8/1916 | Zeek |
| 2,388,297 A | * | 11/1945 | Slaughter ..................... 428/53 |
| 3,387,733 A | * | 6/1968 | Field ........................ 217/12 R |
| 4,007,567 A | * | 2/1977 | Mooney et al. ............... 52/262 |
| 4,212,405 A | * | 7/1980 | Schmidt ...................... 220/1.5 |
| 4,222,606 A | * | 9/1980 | Brown et al. ............. 296/186.1 |
| 4,639,031 A | | 1/1987 | Truckenbrodt |
| 4,936,477 A | | 6/1990 | King et al. |
| 5,122,933 A | | 6/1992 | Johnson |
| 5,178,292 A | | 1/1993 | Korzeniowski |
| 5,180,078 A | | 1/1993 | Looker |
| 5,255,806 A | | 10/1993 | Korzeniowski et al. |
| RE34,892 E | | 4/1995 | Dunwoodie |
| 5,472,290 A | * | 12/1995 | Hulls ......................... 403/393 |
| 5,533,616 A | | 7/1996 | Crowfoot |
| 5,664,826 A | * | 9/1997 | Wilkens .................. 296/186.1 |
| 5,791,726 A | * | 8/1998 | Kaufman ................. 296/182.1 |
| 5,992,117 A | * | 11/1999 | Schmidt ..................... 52/582.1 |
| 6,161,714 A | | 12/2000 | Matsuura et al. |
| 6,220,651 B1 | * | 4/2001 | Ehrlich ..................... 296/186.1 |
| 6,349,988 B1 | * | 2/2002 | Foster et al. ............. 296/181.6 |
| 2001/0051079 A1 | | 12/2001 | Arai |

* cited by examiner

Primary Examiner—D. Glenn Dayoan
Assistant Examiner—Greg Blankenship
(74) Attorney, Agent, or Firm—Mitchell A. Smolow

(57) ABSTRACT

A shipping container main storage unit is disclosed comprising a floor; a perimeter wall supported by a floor perimeter edge; an access opening within the perimeter wall; and a roof fastened to a top edge of a cap, a side edge of the cap fastened to the perimeter wall. The perimeter wall includes at least one pair of wall channels for slidingly receiving at least one clear wall panel, the pair of wall channels fastened to the floor at a first end and to the cap at a second end, and an effective space for slidingly withdrawing the wall panel is located between the roof and the perimeter wall upon removal of the cap. The invention is envisioned for use with semi-trailers, railroad cars, intermodal freight containers and air cargo containers.

26 Claims, 3 Drawing Sheets

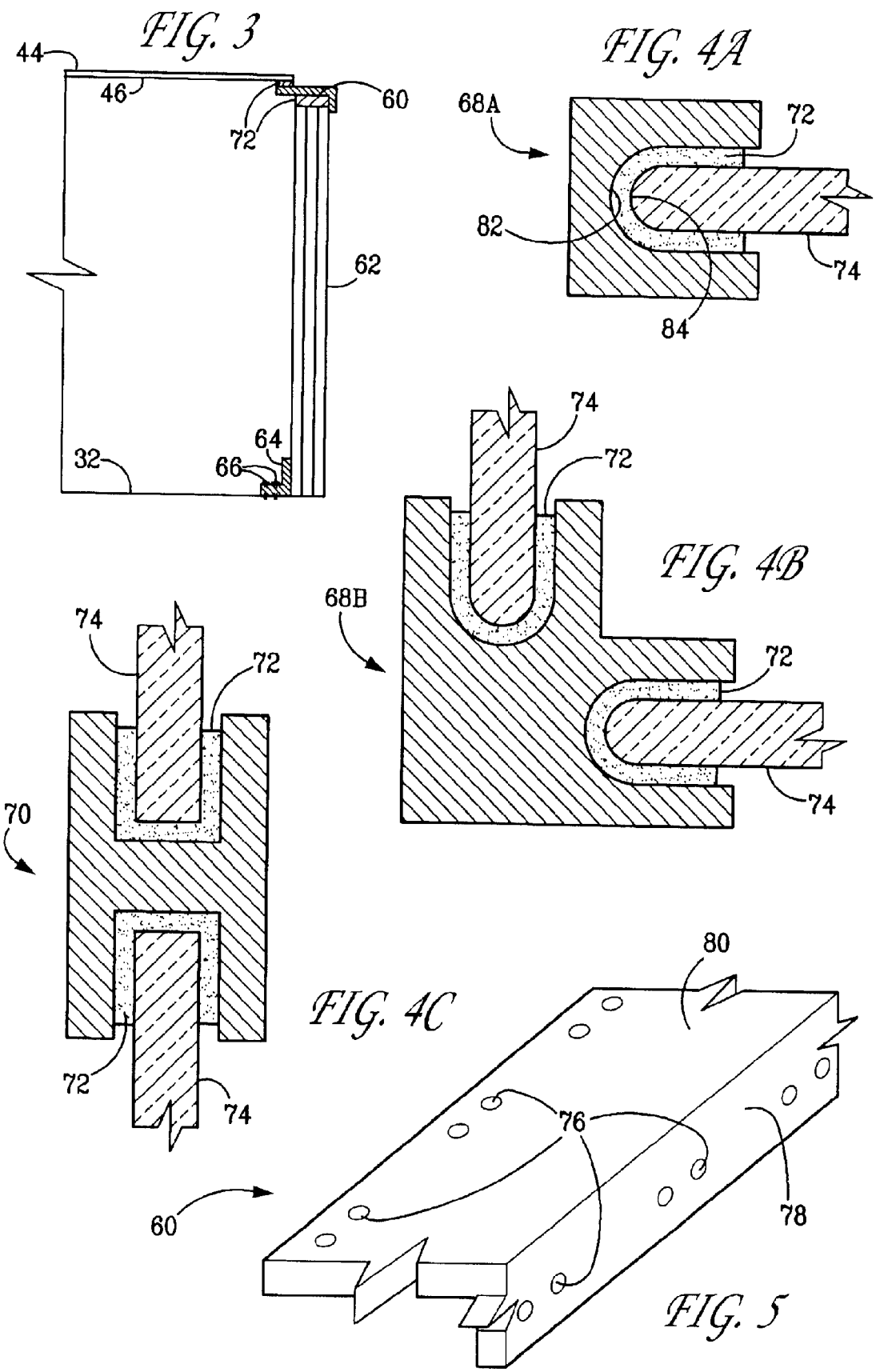

TRANSPARENT SHIPPING CONTAINER

FIELD OF THE INVENTION

This invention relates generally to cargo containers, and in particular, to a transparent cargo container offering the ability to visually inspect the contents without opening the container.

BACKGROUND OF THE INVENTION

Since the dawn of the industrial age, manufacturers, distributors and shippers have strived to develop efficient and cost effective ways to transport goods. Sailing ships, horse and ox drawn carts gave way to ocean freighters, trains, trucks and eventually, the airplane.

Where transported goods were once stowed individually within the transport vehicle, today, the goods are often prepackaged within containers prior to transport. Such containers include, but are not limited to, intermodal transport carriers, semi-trailers and air cargo containers.

Products for inter-country shipment are usually loaded into an intermodal freight container at a site of manufacturer and shipped to a seaport by rail transportation. The intermodal freight container is then loaded into an ocean-going ship for transport between continents. Upon arrival at the destination continent, the intermodal freight container is removed from the ship and loaded onto a railroad transport car for delivery to a particular city where the container can be loaded onto a truck transport for delivery to a local destination.

The modern semi-trailer is removable from its tractor unit (used for hauling), generally attached by a "fifth wheel". More recently, a second truck trailer may be removably attached to the first truck trailer.

The modern air cargo container is a monocoque structure comprising a rigid frame to which a sheet material, generally referred to as the "skin" is attached to the frame. The ideal air cargo container is light in weight, low in cost and capable of withstanding both inflight stresses and the day to day rigors of service without being damaged.

In the past, the side walls of containers and container structures have generally been manufactured from opaque materials, such as aluminum, sheet metal and fiberglass. Side panels used to form the side walls have been attached to the container frame most often using a bolt or rivet that passed through the panel. Transparent side panels have been attempted in the past to aid cargo handlers in determining how or to what extent the cargo container has been loaded. Transparent side panels have also been contemplated to help discourage undesired acts of pilferage.

As governmental authorities have become more concerned with terrorist and other security threats, a higher percentage of sealed opaque containers are being opened for visual inspection, adding both delay and increased cost to shipping. Transparent side panels have the ability to allow easy and efficient visual access to security personnel to assist them in determining whether the container contents have been altered since their original loading or pose some other security risk.

Polycarbonate sheet material has often been considered for use as transparent container side walls. It is transparent, can be struck heavily without being dented, torn or broken, it is light in weight, and is only slightly more costly than the aluminum alloys currently in use.

However, polycarbonate sheet material also has some distinct disadvantages for use as a container side wall material. It has a very high coefficient of thermal expansion, 0.000037 inches per inch per degree Fahrenheit, compared to 0.000013 for aluminum or 0.0000063 for steel. Conventional wisdom has held that for containers encountering wide ranges in temperature variation, mounting holes would have to be oversize in diameter or slotted on each side of the panel. The resultant looseness or "slop" of the panel would reduce the load bearing capability of the panel, requiring heavier and more costly supporting frames.

Polycarbonate sheet material also has the disadvantage of being susceptible to stress induced and crazing agent induced cracking or crazing. When residual stresses remain in polycarbonate, the material is subject to cracking, particularly in the presence of crazing agents, such as hydrocarbons and jet fuel cleaning materials. Once cracked, the cracks spread very easily.

Prior attempts at utilizing plastic side wall materials have included the following:

U.S. Pat. No. 5,180,078 to Looker, directed to an air cargo container in which a polycarbonate sheet material is used as the skin of the structure. The attachment assembly includes a significant area of overlap between the polycarbonate and metal components as well as an attachment strip which substantially covers the attachment area. Rivets or bolts are inserted through oversized holes in the metal, polycarbonate, and attachment strip and then torqued, creating a rigid joint.

U.S. Pat. No. 5,178,292 to Korzeniowski is directed to an intermodal freight container constructed substantially of reinforced plastic composite material. The container includes a space frame structure which contains a reinforced plastic composite brace extending between and secured to the roof and sidewall, forming a somewhat tri-angularly shaped main upper composite frame beam in the container.

U.S. Pat. No. 4,936,477 to King et al. is directed to a cargo container which includes a number of elongated frame members each having an elongated channel and an elongated recess, and a number of coupling members removably engageable with the ends of the frame members. A number of panels are removably engageable within the elongated channels in the frame members. Each of the panels has an elongated recess around a perimeter which, together with the elongated recess in each of the frame members, forms an elongated slot. A locking element is removably insertable into the slots formed by the panel recesses and the frame member recesses when the panels are in engagement with the channels, to lock the frame members, panels and coupling members into a substantially rigid assembly. The panel is glued around its perimeter to a rigid perimeter edge.

U.S. Pat. No. 6,161,714 to Matsuura et al. is directed to a cargo container where the sidewalls are made of fiber reinforced plastic plates. Other parts of the container, such as the frame and door are made of any conventional metallic material. The mount portions containing the holes for the rivets or bolts are made thicker than other portions of the container.

U.S. Pat. No. Re. 34,892 to Dunwoodie is directed to a container using interlocking corner joints. At least one nut and bolt combination is inserted through aligned holes in an outer and inner corner molding strips and tightened to compress and retain the outer and inner corner molding strips to an outer side skin inserted between them in a releasable lengthwise relation. An inner side skin forms an interior wall of the container in similar fashion.

U.S. Pat. No. 5,255,806 to Korzeniowski et al. is directed to a reinforced plastic composite intermodal vehicle hauler. Aligned and interconnected panels which include integrally formed ribs form the sidewalls. The walls are made of a reinforced plastic composite material.

In the previous attempts at creating plastic sidewalls, significant effort is required to replace a damaged side panel. Removal of the panel requires disassembly of numerous nut and bolt combinations, or shearing of numerous rivets, often requiring special tools.

Accordingly, there remains a continuing need for improved methods to attach clear polycarbonate and other sheet material to a structural element to be used as a transparent side panel for a shipping container. The present invention fulfills this need, and further provides related advantages.

SUMMARY OF INVENTION

The novel attachment of a polycarbonate or other plastic sheet material to a structural frame described by this invention allows for non-slip placement of the side wall, easy and economical replacement of a damaged side wall, and does not induce cracking or crazing of the plastic sheet material.

A structural frame is channeled to receive an edge of the sheet material. Contained within the channel is a weather resistant deformable material which serves to both prevent slippage or sliding of the sheet material and to seal the sheet material structural frame interface, thereby protecting the container contents from the elements.

An easily removed cap is mounted to the structural frame to keep the sheet material within the structural frame and to serve as a roof attachment point.

The transparent side walled container of the present invention is capable of free standing use, such as, for example, an intermodal transport container or air cargo container, or it may be mounted to a vehicle frame for use in, for example, a semi-trailer or rail box car.

One advantage of the present invention is the ability to allow easy and efficient visual access to security personnel to assist them in determining whether the container contents have been altered since their original loading or pose some other security risk.

Another advantage of the present invention is the ability to easily and cost efficiently replace a damaged side panel with out the need for specialized tools.

Still another advantage of the present invention is the reduction of wind resistance (resulting in greater fuel economy) through the reduction of required numbers of bolts, nuts, rivets and other fasteners previously used to attach a side panel to a structural element.

Other features and advantages of the present invention will be apparent from the following more detailed description of the preferred embodiments, taken in conjunction with the accompanying drawings which illustrate, by way of example, the principles of the invention.

BRIEF DESCRIPTION OF DRAWINGS

FIG. 3 is a view of the side wall member;

FIGS. 4A through 4C are cross-sectional views of the side wall channels;

FIG. 5 is a view of the L shaped cap;

DETAILED DESCRIPTION

Figure 1:
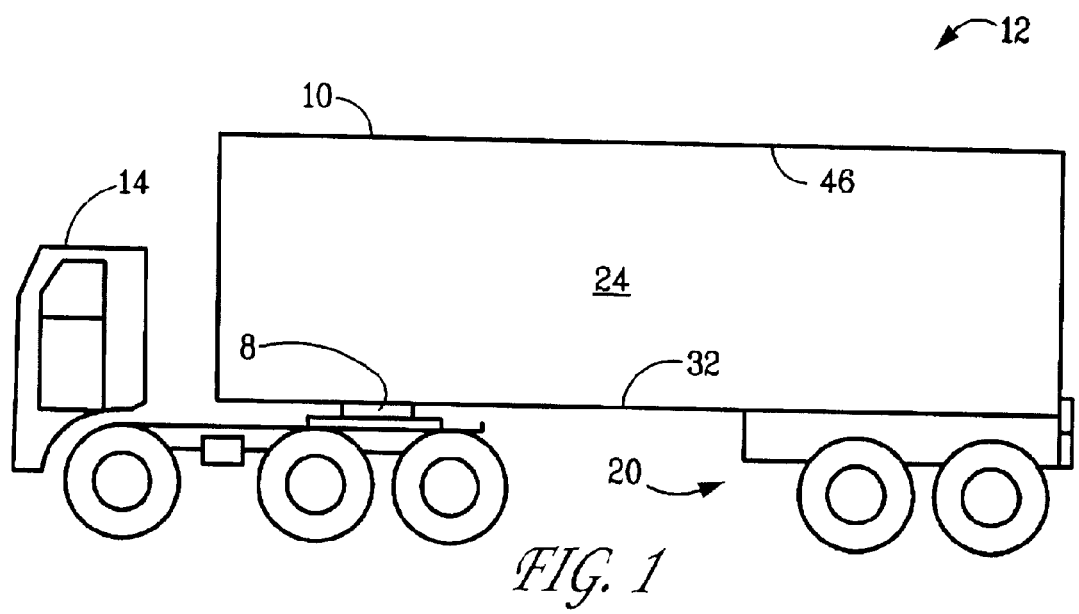
FIG. 1 is a side view of a first preferred embodiment showing a tractor trailer combination.

In a first preferred embodiment, the present invention is utilized in combination with a wheeled transport component, for example, a tractor trailer. Referring now to the accompanying drawings, FIG. 1 illustrates an overview of a trailer 10 of a tractor trailer combination 12. Tractor 14 of tractor trailer combination 12 is a conventional motorized tractor having a "fifth wheel" for coupling trailer 10 thereto for articulated combined movement of tractor 14 and trailer 10 along a road. Trailer 10 includes a chassis (not shown), a pair of wheel assemblies 20 mounted to the underside of the chassis for rollingly supporting trailer 10 on a road surface, a fifth wheel coupling assembly (not shown) for coupling trailer 10 to the fifth wheel 8 of tractor 14, and a main storage unit 24. The chassis, wheel assemblies 20 and the fifth wheel coupling assembly of trailer 10 are all of conventional construction as used in many commercially available tractor trailer combinations.

Main storage unit 24 is fixedly mounted to, and laterally centered on the chassis. Main storage unit 24 is of generally box-like configuration with a longitudinal extent about six times greater than its lateral extent and a height extent about the same order of magnitude as its lateral extent. However, the dimensions of main storage unit 24 are limited only by applicable governmental regulations.

Floor 32 is laterally centered on the chassis, and fixedly mounted thereto by conventional means (not shown), such as by welding, bolting or other suitable attachment means. Floor 32 supports the freight load (not shown) during loading and unloading, and during the transport and storage of those items. Floor 32 is preferably composed of material which presents a relatively smooth, impermeable surface of sufficient strength and rigidity to resist deflection during the movement and storage of the load thereon, for example, tightly jointed wooden floor boards.

Figure 2:
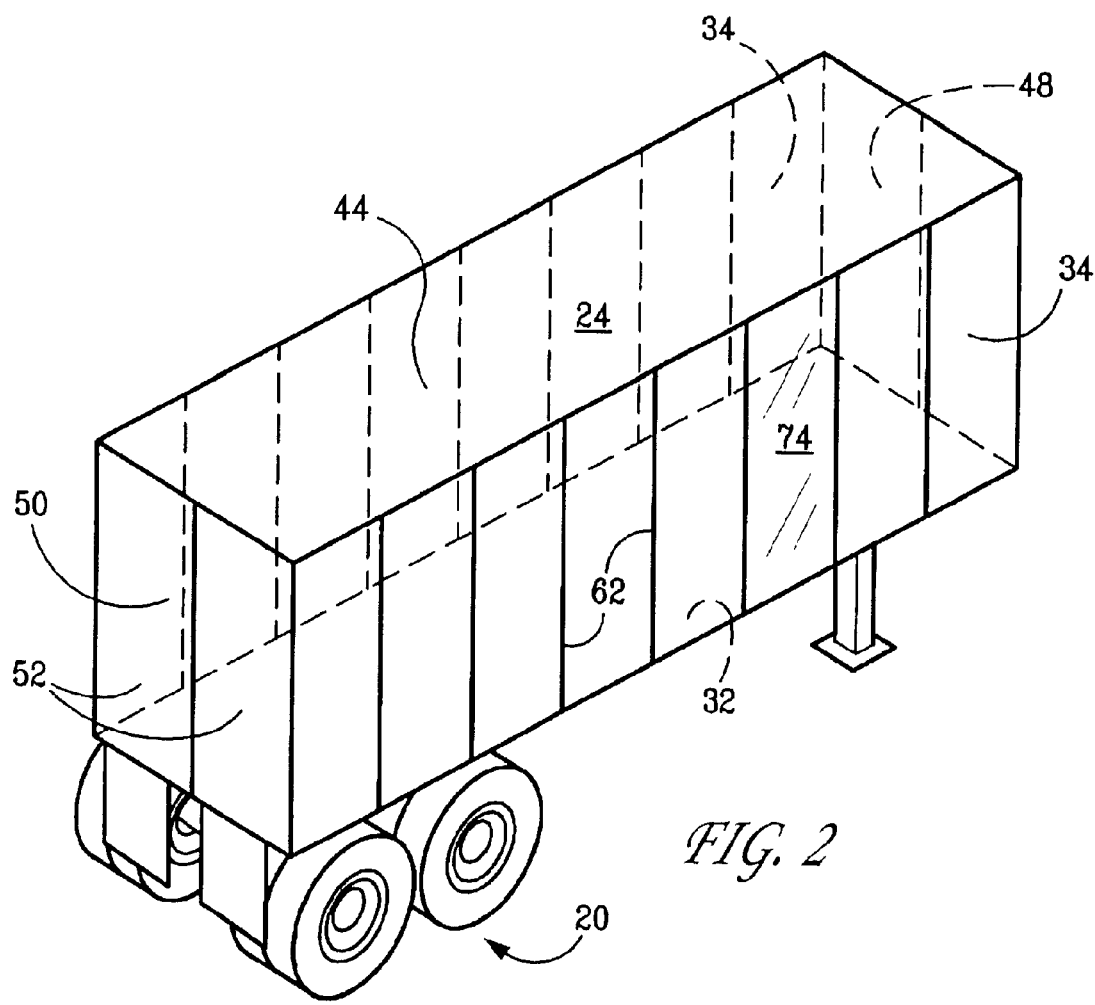
FIG. 2 is a perspective view of the shipping container shown in FIG. 1.

Referring also to FIG. 2, main storage unit 24 additionally includes a pair of spaced apart, flat side wall members 34 arranged parallel to one another, front end wall member 48 which extends between wall members 34 at one end thereof, and access opening 50 formed at the other end which also extends between side walls 34. Each wall member 34 rests upon floor 32 along a respective longitudinal edge thereof and extends generally perpendicularly with respect to floor 32, described in greater detail below. Together, side wall members 34, access opening 50 and front end wall 48 form the perimeter wall which rests upon the floor perimeter edge.

Conventional roof member 44, constructed of a metal base frame (not shown) covered on both sides by thin metal coverings (not shown), is mounted by removably fastening, for example, by bolting or riveting, to the top edge of an easily removed, generally "L" shaped cap 60 (FIG. 5, described in greater detail below) and front wall member 48, with the inwardly facing surface of the metal skin of roof member 44 defining a ceiling (not shown) in generally facing relation to floor 32.

Access opening 50 is sealed by a pair of doors 52 hingedly mounted to a vertical edge portion of a respective one of side wall members 34 and each having a width approximately equal to one-half the lateral extent of main storage unit 24. The pair of doors 52 substantially completely seal access opening 50 when pivoted about their respective hinges (not shown) to their closed position in generally coplanar relationship with one another.

The doors 52 are conventional over-the-road trailer doors and include a metal skin fastened to opposite sides of an internal metal framework so as to enclose the metal framework therein, and additionally include conventional locking devices (not shown) for engaging floor 32 and roof member 44 to retain the doors in their closed position. Thus, floor 32, side wall members 34, front wall 48, doors 52 and ceiling 46 define a substantially enclosed compartment which provides good protection against weather elements and the like for the any load stored therein.

A plurality of side wall channels 62 are mounted to floor 32 along a respective longitudinal edge thereof and extend generally perpendicularly with respect to floor 32. FIG. 3 displays a side view of side wall channel 62. Side wall channels 62 are mounted to floor 32 with, for example, bracket 64 and fasteners 66 such as nuts and bolts or rivets. Although bracket 64 is shown mounting on the inside of side wall channels 62, it may optionally be mounted on the outside of channels 62, thereby presenting a smooth, even floor 32 along the inside perimeter of main storage unit 24. Each side wall channel 62 is preferably fabricated from a substantially rigid, preferably lightweight material, for example, metal such as die cast, extruded, or rolled aluminum, aluminum alloy, carbon and stainless steel; molded plastic; layed up laminate plastic; wood and combinations thereof.

Referring to FIGS. 4A through 4C respectively, side wall end channels 68A, 68B are slotted to receive side wall panel 74. Side wall panel slot 82 is shaped to be a mirror image of the side wall panel edge 84 to create a more effective seal. Slot may be, for example, rounded or square. Side wall end channels are, for example, U shaped in cross section to receive a single side wall panel 74, or L shaped in cross section to receive two side wall panels 74, while side wall mid channel 70 is H shaped in cross section to receive two side wall panels 74. Contained within channel 68, 70 is a weather resistant deformable material 72 which serves to both prevent slippage or sliding of a side wall panel 74 and to seal the side wall panelside wall channel interface, thereby further protecting the load from the elements. Examples of such weather resistant deformable material 72 are felt, rubber, neoprene and the like. Weather resistant deformable material 72 may be frictionally held within side wall channel 62 or it may be adhered to side wall channel 62 with, for example, weather resistant adhesive. Weather resistant deformable material 72 is likewise placed on floor 32 between each side wall channel 62, thereby creating a weather resistant seal between the bottom of side wall panel 74 and floor 32.

Side wall panel 74 is slidingly fit within a pair of side wall channels 62 to rest on and be supported by floor 32. The presence of weather resistant deformable material 72 between side wall panel 74 and floor 32, side wall channel 62, and L shaped cap 60 (described in greater detail below) protects the interior of main storage unit 24 from the elements.

Side wall panel 74 is also fabricated from substantially rigid, preferably lightweight material, for example, metal such as die cast, extruded, or rolled aluminum, aluminum alloy, carbon and stainless steel; molded plastic; layed up laminate plastic; wood and combinations thereof. Preferably, at least one side wall panel 74 is fabricated from a clear material, for example, polycarbonate sheet material.

Front end wall member 48 and access opening 50 are mounted to floor 32 in conventional manner, well known in the art. Optionally, front end wall member 48 may also be constructed utilizing the present invention as has been described above for side wall member 34.

After insertion, side wall panel 74 "floats" within side wall channels 62, floor 32 and L shaped cap 60. No side wall panel bolt holes or mounting slots are required for mounting the side wall panel 74, thereby reducing the likelihood of crazing and cracking of the side wall panel 74 when polycarbonate or other like material is used. Any thermal expansion or contraction of side wall panel 74 is accommodated by weather resistant deformable material 72. Furthermore, the absence of bolts, rivets and the like creates less wind resistance, thereby increasing gas mileage and economies.

Referring now to FIGS. 3 and 5, a cap, for example, an L shaped cap 60, is constructed of similar material as described above. Mounting orifices 76, for example, holes or slots, are fabricated into side edge 78 and top edge 80 of L shaped cap 60 to align with similar orifices machined into side wall channel 62 and roof member 44, respectively. While L shaped cap 60 may be of unitary construction to run the entire length and/or width of main storage unit 24, preferably, L shaped cap 60 is fabricated into a plurality of sections to allow for easy removal, repair or replacement of a single damaged side wall panel 74, as explained in detail below. In the preferred embodiment, the L shaped cap 60 spans three side wall channels 62, thereby allowing for easy removal of two side wall panels 74.

After slidable insertion of side wall panel 74 and placement of weather resistant deformable material 72 as described above, L shaped cap 60 is fastened to side wall channels 62, for example with nuts, bolts or rivets through respective orifices, thereby retaining side wall panel 74 throughout its entire perimeter. Roof member 44 is likewise mounted to top edge 80 of L shaped cap 60 after placement of weather resistant deformable material 72.

When sectional units of L shaped cap 60 are used, adjoining sections terminate on and are fastened to a single side wall channel 62. Roof member 44 is fabricated to be narrower in width between side wall members 34, such that after mounting, an effective space remains between roof member 44 and side wall member 34 which allows side wall panel 74 to slidably engage side wall channel 62 without removal of roof member 44. In this manner, a damaged side wall panel 74 may be replaced without having to remove roof member 44 simply by unbolting and removing L shaped cap 60, thereby allowing the damaged side wall panel 74 to be slidably removed and replaced.

While in the preferred embodiment, front end wall member 48 is of conventional design, it may also be constructed using the novel design of the present invention to permit easy removal of front end wall member panels. When front end wall member 48 is of conventional design, L shaped bracket 60 may optionally be mounted over roof member 44 to further aid in weather protection. If front end wall member 48 is constructed utilizing the novel features of the present invention, roof member 44 would also be fabricated to have an effective space between roof member 44 and front end wall member 48 as described above.

Optionally, a predetermined distance from each corner of main storage unit 24, for example, the first four feet or the first eight feet, may be constructed of conventional sheet metal riveted to side supports (not shown) for increased structural strength, with the remaining wall construction being the novel design of the present invention. Alternatively, the perimeter wall may be constructed of conventional panel design alternated with the novel design of the present invention without limit to a specific pattern (not shown).

Furthermore, while the intent of the present invention is to allow for at least one transparent panel, for example, a polycarbonate panel, it is to be understood that the novel design allows for individual panels of different material in unlimited combinations.

Figure 6:
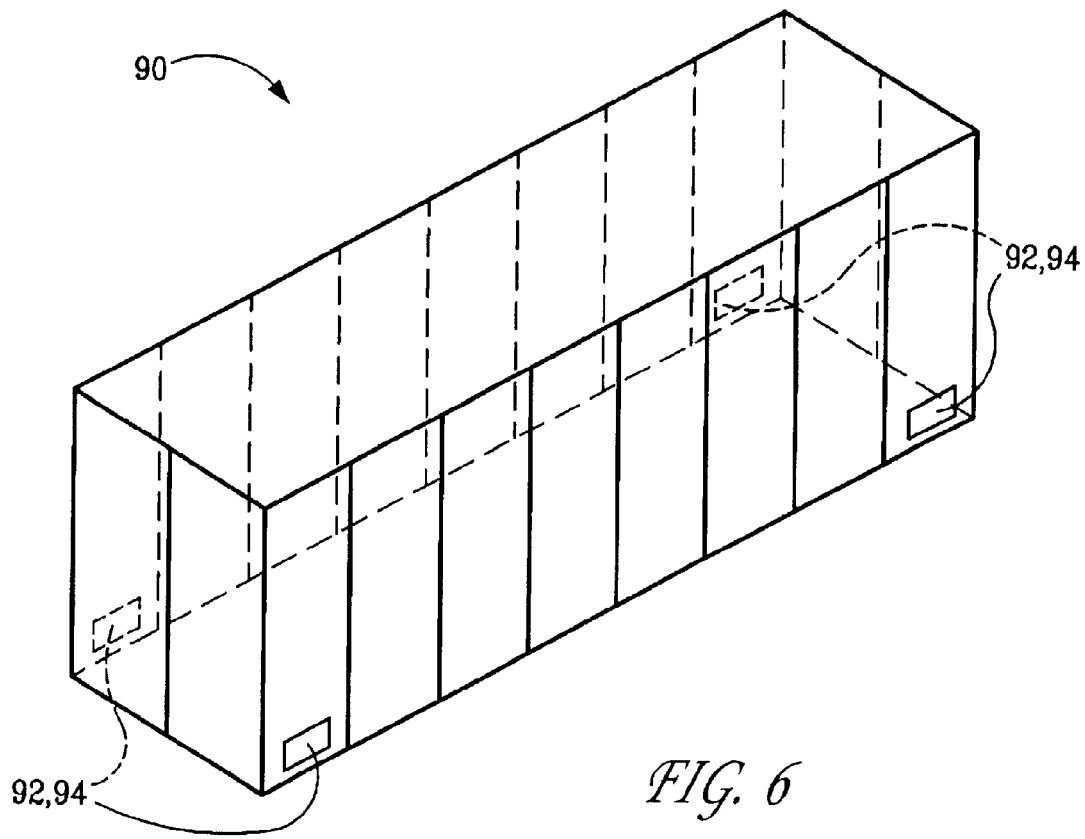
FIG. 6 is a perspective view of a second preferred embodiment showing an intermodal transport container.

In a second preferred embodiment, shown in FIG. 6, the novel design of the present invention is incorporated into an intermodal transport container 90. In this embodiment, the chassis, wheel assemblies and fifth wheel coupling are replaced by conventional intermodal lifting points 92 and conventional intermodal lock down assemblies 94. In all other aspects, the intermodal transport container 90 is as described above.

Figure 7:
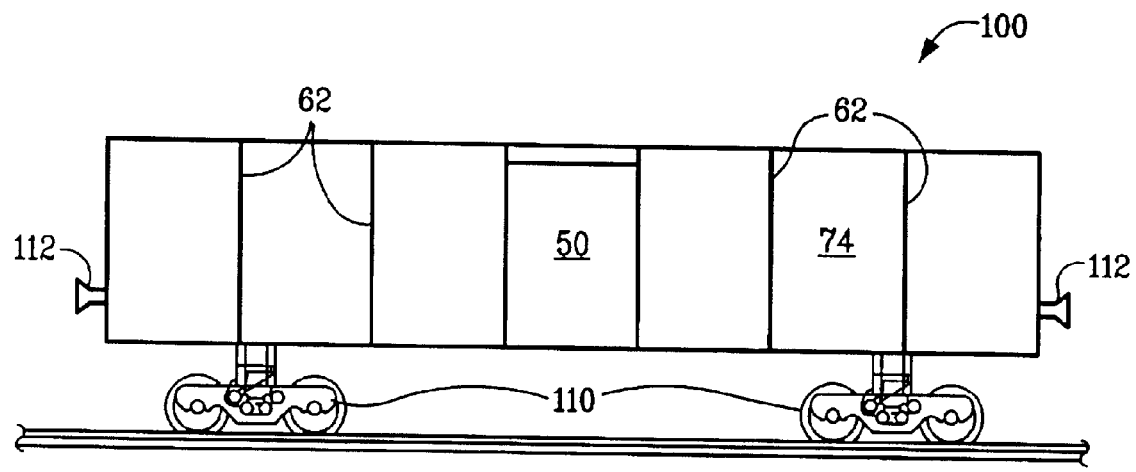
FIG. 7 is a side view of a third preferred embodiment showing a railroad box car.

In a third preferred embodiment, shown in FIG. 7, the novel design of the present invention may be incorporated into a railroad freight car 100. In this embodiment, wheel assemblies and fifth wheel coupling are replaced by conventional railroad freight car suspensions (not shown), coupling assemblies 112 and wheel assemblies 110. In all other aspects, the railroad freight car 100 is as described above.

While the above description contains many specifics, these should not be construed as limitation on the scope of the invention, but rather as an exemplification of preferred embodiments thereof. It should be apparent to those skilled in the art that many other variations are possible. For example, the novel features of the present invention may likewise be incorporated into the structure of any shipping container, for example, an air cargo container. Furthermore, although the first embodiment was described for use with a semi trailer, it should be understood that its use is not limited thereto, but may be used with other truck designs, for example, a straight body or van body or truck.

These examples and embodiments are intended as typical of, rather than in any way limiting on, the scope of the present invention as presented in the appended claims.

What is claimed is:

1. A shipping container main storage unit comprising:
   a floor;
   a perimeter wall supported by a floor perimeter edge;
   an access opening within the perimeter wall; and
   a roof fastened to a top edge of a cap, a side edge of the cap fastened to the perimeter wall;
   wherein the perimeter wall comprises at least one pair of wall channels for slidingly receiving a wall panel, the pair of wall channels fastened to the floor at a first end and to the cap at a second end, and an effective space for slidingly withdrawing the wall panel is located between the roof and the perimeter wall upon removal of the cap.

2. The shipping container main storage unit of claim 1 further including a weather resistant deformable material positioned between the wall panel and the floor, the cap and the at least one pair of wall channels.

3. The shipping container main storage unit of claim 1 wherein the perimeter wall comprises:
   a first side wall supported by a first floor longitudinal edge;
   a second side wall supported by a second floor longitudinal edge;
   a front end wall extending between the first and second side wall and supported by a floor front edge; and
   a rear end wall opposite the front end wall extending between the first and second side wall and supported by a floor rear edge.

4. The shipping container main storage unit of claim 3 wherein the access opening is located within the rear end wall and includes a door.

5. The shipping container main storage unit of claim 1 wherein the at least one pair of wall channels comprises two channels selected from the group consisting of a mid channel and an end channel.

6. The shipping container main storage unit of claim 5 wherein the mid channel is substantially H shaped in cross section and the end channel is substantially shaped in cross section selected from the group consisting of C shaped and L shaped.

7. The shipping container main storage unit of claim 2 wherein the weather resistant deformable material is fabricated from a material selected from the group consisting of felt, rubber, neoprene and combinations thereof.

8. The shipping container main storage unit of claim 2 wherein the weather resistant deformable material is frictionally held in position.

9. The shipping container main storage unit of claim 2 wherein the weather resistant deformable material is held in position with weather resistant adhesive.

10. The shipping container main storage unit of claim 1 wherein the wall panel is fabricated from a substantially rigid, lightweight material.

11. The shipping container main storage unit of claim 1 wherein the wall panel is fabricated from a material selected from the group consisting of die cast aluminum, extruded aluminum, rolled aluminum, aluminum alloy, carbon steel, stainless steel, molded plastic, layed up laminate plastic, wood and combinations thereof.

12. The shipping container main storage unit of claim 1 wherein the wall panel is fabricated from substantially transparent material.

13. The shipping container main storage unit of claim 1 wherein the wall panel is fabricated from substantially clear polycarbonate material.

14. The shipping container main storage unit of claim 1 wherein the cap is removably fastened to the roof and the perimeter wall.

15. The shipping container main storage unit of claim 1 wherein the cap is comprised of a plurality of sections.

16. The shipping container main storage unit of claim 15 wherein contiguous sections terminate on the same wall channel.

17. The shipping container of claim 1 wherein the cap is substantially L shaped.

18. The shipping container main storage unit of claim 1 further including a chassis mounted to the floor, a fifth wheel coupling assembly mounted to the chassis, and a wheel assembly mounted to the chassis.

19. The shipping container main storage unit of claim 1 further including at least one intermodal lifting point and at least one intermodal lock down assembly positioned effectively for intermodal transport of the main storage unit.

20. The shipping container main storage unit of claim 1 further including a chassis mounted to the floor, a railroad car suspension mounted to the chassis, coupling assemblies mounted to the chassis, and railroad wheel assemblies mounted to the chassis.

21. A method for transporting freight comprising:
   selecting freight to be transported;
   loading the selected freight into a shipping container; and
   transporting the shipping container to a predetermined destination;
   wherein a shipping container main storage unit comprises:
     a floor;
     a perimeter wall supported by a floor perimeter edge;
     an access opening within the perimeter wall; and
     a roof fastened to a top edge of a cap, a side edge of the cap fastened to the perimeter wall;

wherein the perimeter wall comprises at least one pair of wall channels for slidingly receiving a wall panel, the pair of wall channels fastened to the floor at a first end and to the cap at a second end, and an effective space for slidingly withdrawing the wall panel is located between the roof and the perimeter wall upon removal of the cap.

22. The method of claim 21 wherein the main storage unit further includes a weather resistant deformable material positioned between the wall panel and the floor, the cap and the at least one pair of wall channels.

23. The method of claim 21 wherein the cap is substantially L shaped.

24. The method of claim 21 wherein the perimeter wall comprises:
- a first side wall supported by a first floor longitudinal edge;
- a second side wall supported by a second floor longitudinal edge;
- a front end wall extending between the first and second side wall and supported by a floor front edge; and
- a rear end wall opposite the front end wall extending between the first and second side wall and supported by a floor rear edge.

25. A semi-trailer for shipping freight comprising:
- a floor;
- a perimeter wall having
  - a first side wall supported by a first floor longitudinal edge;
  - a second side wall supported by a second floor longitudinal edge;
  - a front end wall extending between the first and second side wall and supported by a floor front edge;
  - a rear end wall opposite the front end wall extending between the first and second side wall and supported by a floor rear edge;
- an access opening within the rear end wall;
- a roof fastened to a top edge of an L shaped cap, a side edge of the L shaped cap fastened to the perimeter wall;
- a weather resistant deformable material positioned between a wall panel and the floor, the L shaped cap and at least one pair of wall channels;
- a chassis fastened to the floor;
- a fifth wheel coupling assembly fastened to the chassis; and
- a wheel assembly fastened to the chassis;
- wherein the at least one pair of wall channels for slidingly receiving the wall panel are fastened to the floor at a first end and to the L shaped bracket at a second end, an effective space for slidingly withdrawing the wall panel is located between the roof and the perimeter wall upon removal of the L shaped cap, and at least one wall panel is clear.

26. An intermodal transport unit for shipping freight comprising:
- a floor;
- a perimeter wall having
  - a first side wall supported by a first floor longitudinal edge;
  - a second side wall supported by a second floor longitudinal edge;
  - a front end wall extending between the first and second side wall and supported by a floor front edge;
  - a rear end wall opposite the front end wall extending between the first and second side wall and supported by a floor rear edge;
- an access opening within the rear end wall;
- a roof fastened to a top edge of an L shaped cap, a side edge of the L shaped cap fastened to the perimeter wall;
- a weather resistant deformable material positioned between a wall panel and the floor, the L shaped cap and at least one pair of wall channels; and
- at least one intermodal lifting point and at least one intermodal lock down assembly positioned effectively for intermodal transport;
- wherein the at least one pair of wall channels for slidingly receiving the wall panel are fastened to the floor at a first end and to the L shaped bracket at a second end, an effective space for slidingly withdrawing the wall panel is located between the roof and the perimeter wall upon removal of the L shaped cap, and at least one wall panel is clear.

* * * * *